(12) United States Patent
Wu et al.

(10) Patent No.: US 12,728,925 B2
(45) Date of Patent: Sep. 8, 2026

(54) SLIDING FRAME ASSEMBLY FOR TRAILERS

(71) Applicant: GUANGDONG FUWA HEAVY INDUSTRIES CO., LTD., Jiangmen (CN)

(72) Inventors: Zhiqiang Wu, Taishan City (CN); Heng Zhang, Taishan City (CN); Binhuan Zhong, Taishan City (CN)

(73) Assignee: GUANGDONG FUWA HEAVY INDUSTRIES CO., LTD., Jiangmen (CN)

( * ) Notice: Subject to any disclaimer, the term of this patent is extended or adjusted under 35 U.S.C. 154(b) by 363 days.

(21) Appl. No.: 18/488,183

(22) Filed: Oct. 17, 2023

(65) Prior Publication Data

US 2024/0149949 A1 May 9, 2024

(30) Foreign Application Priority Data

Nov. 3, 2022 (CN) ......................... 202211365012.5

(51) Int. Cl.
*B62D 21/20* (2006.01)
*B62D 21/02* (2006.01)
*B62D 21/11* (2006.01)
*B62D 27/02* (2006.01)

(52) U.S. Cl.
CPC ............ *B62D 21/20* (2013.01); *B62D 21/02* (2013.01); *B62D 21/11* (2013.01); *B62D 27/02* (2013.01)

(58) Field of Classification Search
CPC ........ B62D 21/10; B62D 21/11; B62D 21/20; B62D 53/06; B62D 61/10; B62D 63/06; B62D 63/068; B62D 63/08
USPC ................................................ 296/204, 205
See application file for complete search history.

(56) References Cited

U.S. PATENT DOCUMENTS

| | | | | |
|---|---|---|---|---|
| 8,801,013 | B2 * | 8/2014 | Ramsey | B62D 21/11 280/124.11 |
| 2017/0370451 | A1 * | 12/2017 | Wall | B62D 21/20 |
| 2018/0334004 | A1 | 11/2018 | Andreasen et al. | |
| 2018/0370311 | A1 * | 12/2018 | Lin | B62D 21/02 |

(Continued)

FOREIGN PATENT DOCUMENTS

| | | |
|---|---|---|
| CN | 206797479 U | 12/2017 |
| CN | 214524060 U | 10/2021 |

(Continued)

*Primary Examiner* — Jason S Daniels
(74) *Attorney, Agent, or Firm* — MUNCY, GEISSLER, OLDS & LOWE, P.C.

(57) ABSTRACT

Provided is a sliding frame assembly for trailers. The sliding frame assembly for trailers includes two longitudinal beams, a number of cross beams and a suspension system; the longitudinal beam includes a side wall, a top wall located at the top of the side wall, and a bottom wall located at the bottom of the side wall, wherein an opening is formed between the top wall and the bottom wall in the inner side of the longitudinal beam, and an end of the cross beam penetrates through the opening; an end surface of the cross beam and an inner surface of the side wall, an upper surface of the cross beam and a lower surface of the top wall, a lower surface of the cross beam and an upper surface of the bottom wall are fixedly connected together respectively; the suspension system includes a bracket.

9 Claims, 4 Drawing Sheets

(56) References Cited

U.S. PATENT DOCUMENTS

| | | | | |
|---|---|---|---|---|
| 2023/0311994 A1* | 10/2023 | Zawacki | B62D 21/11 | |
| | | | 280/788 | |
| 2025/0033702 A1* | 1/2025 | Wu | B62D 21/20 | |
| 2025/0033703 A1* | 1/2025 | Wu | B62D 53/00 | |
| 2025/0074511 A1* | 3/2025 | Wu | B62D 21/20 | |

FOREIGN PATENT DOCUMENTS

| | | |
|---|---|---|
| CN | 217575356 U | 10/2022 |
| CN | 218907370 U | 4/2023 |

* cited by examiner

SLIDING FRAME ASSEMBLY FOR TRAILERS

CROSS-REFERENCE TO RELATED APPLICATIONS

This application claims the priority of Chinese Patent Application No. 202211365012.5, filed on Nov. 3, 2022, the entire contents of which are hereby incorporated by reference.

FIELD OF TECHNOLOGY

The following application relates to the field of vehicle technology, and in particular to a sliding frame assembly for trailers.

BACKGROUND

A sliding frame for trailers is usually installed on a main beam of the trailer and is used to adjust the distance between the suspension and the tractor so that the load is reasonably distributed and the trailer can be suitable for different road surfaces. A sliding frame assembly for trailers generally includes a frame composed of two longitudinal beams and a number of cross beams, and a suspension system. Several cross beams are connected between the two longitudinal beams. The suspension system is provided below the frame and connected to the frame through brackets. In particular, the bracket is usually welded to the bottom of the longitudinal beam, and the bracket is used to bear the mutual impact between the frame and the suspension system in the height direction. However, when the vehicle is driving on complex road conditions, the impact of the suspension on the frame is not limited to in the height direction, the bracket is also subject to lateral impact from the suspension system, that is, an impact force consistent with the width direction of the sliding frame. In the traditional structure, the bracket is only fixed at the bottom of the longitudinal beam, and it is difficult to ensure that a connection part between the bracket and the frame has strong lateral strength, which affects the driving performance of the vehicle and even affects the safety of the vehicle.

SUMMARY

An aspect of the present application provides a sliding frame assembly for trailers, which is able to increase the lateral strength of a connection part between a bracket and a longitudinal beam.

An aspect of the present application provides a sliding frame assembly for trailers, which includes two longitudinal beams, a number of cross beams connected between the two longitudinal beams, and a suspension system; the longitudinal beam includes a side wall, a top wall located at the top of the side wall, and a bottom wall located at the bottom of the side wall, wherein an opening is formed between the top wall and the bottom wall in an inner side of the longitudinal beam, and an end of the cross beam penetrates through the opening; an end surface of the cross beam and an inner surface of the side wall, an upper surface of the cross beam and a lower surface of the top wall, a lower surface of the cross beam and an upper surface of the bottom wall are fixedly connected together respectively; the suspension system includes a bracket, the bracket includes an outer wall plate, an inner wall plate opposite to the outer wall plate and a connecting piece connected between the outer wall plate and the inner wall plate, wherein an upper end of the outer wall plate abuts an outer surface of the side wall and is connected to the side wall, an upper end of the inner wall plate is connected to the longitudinal beam, and both sides of the inner wall plate are respectively provided with a support plate bent in a direction away from the outer wall plate, and the support plate is connected to the cross beam.

BRIEF DESCRIPTION

DETAILED DESCRIPTION

The present application will be further described below in conjunction with the accompanying drawings and specific embodiments.

Figure 1:
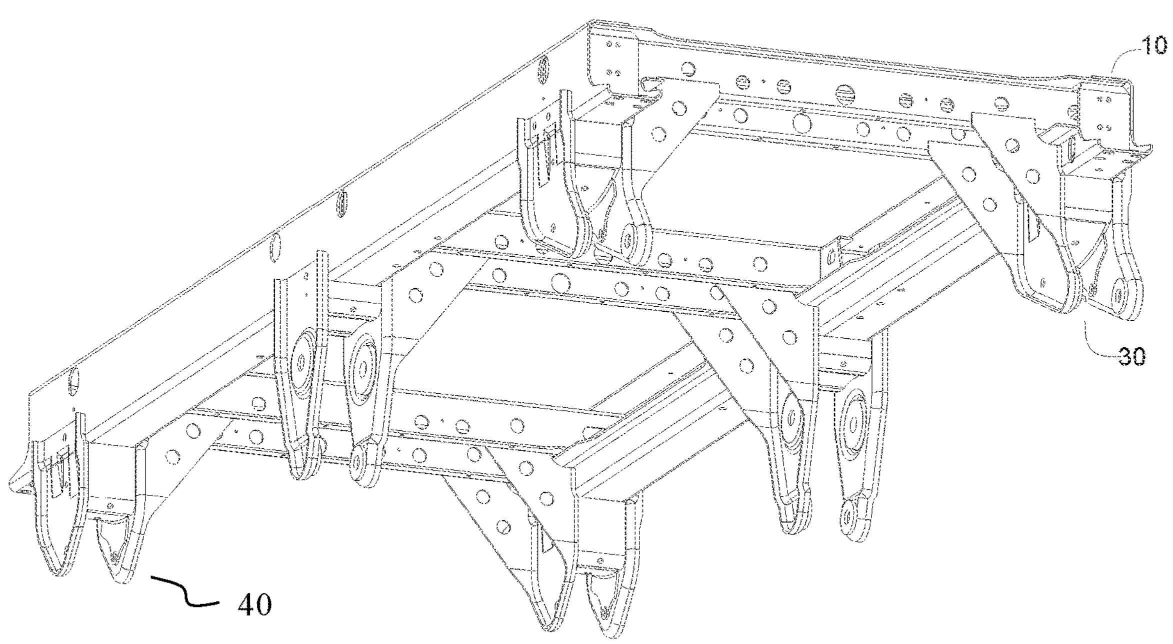
FIG. 1 is a schematic structural view of a sliding frame assembly according to an embodiment of the present application.
Figure 2:
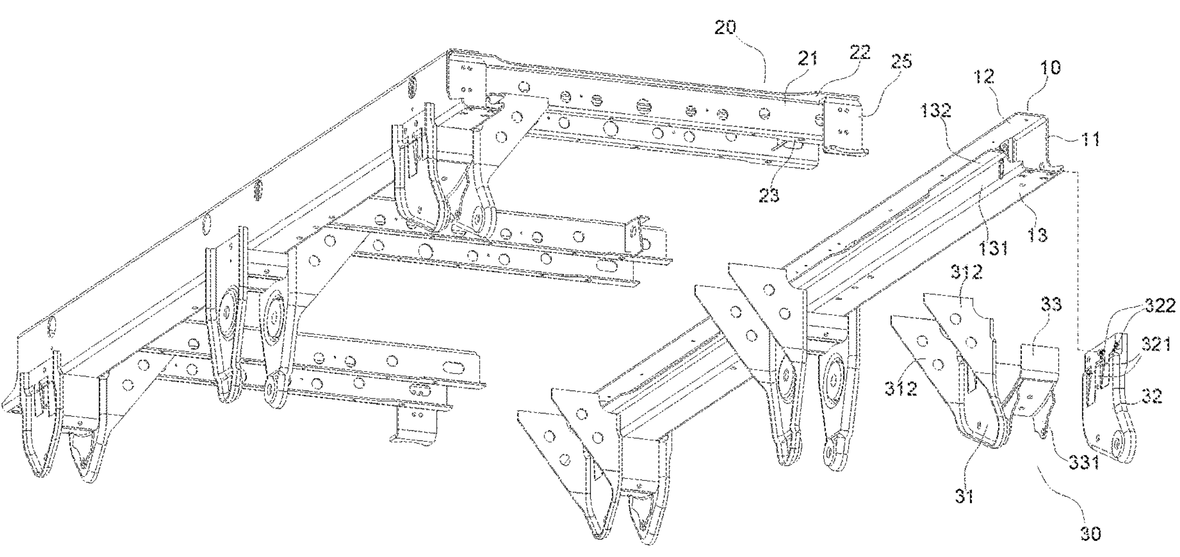
FIG. 2 is a schematic view of the installation of the sliding frame assembly according to an embodiment of the present application.
Figure 3:
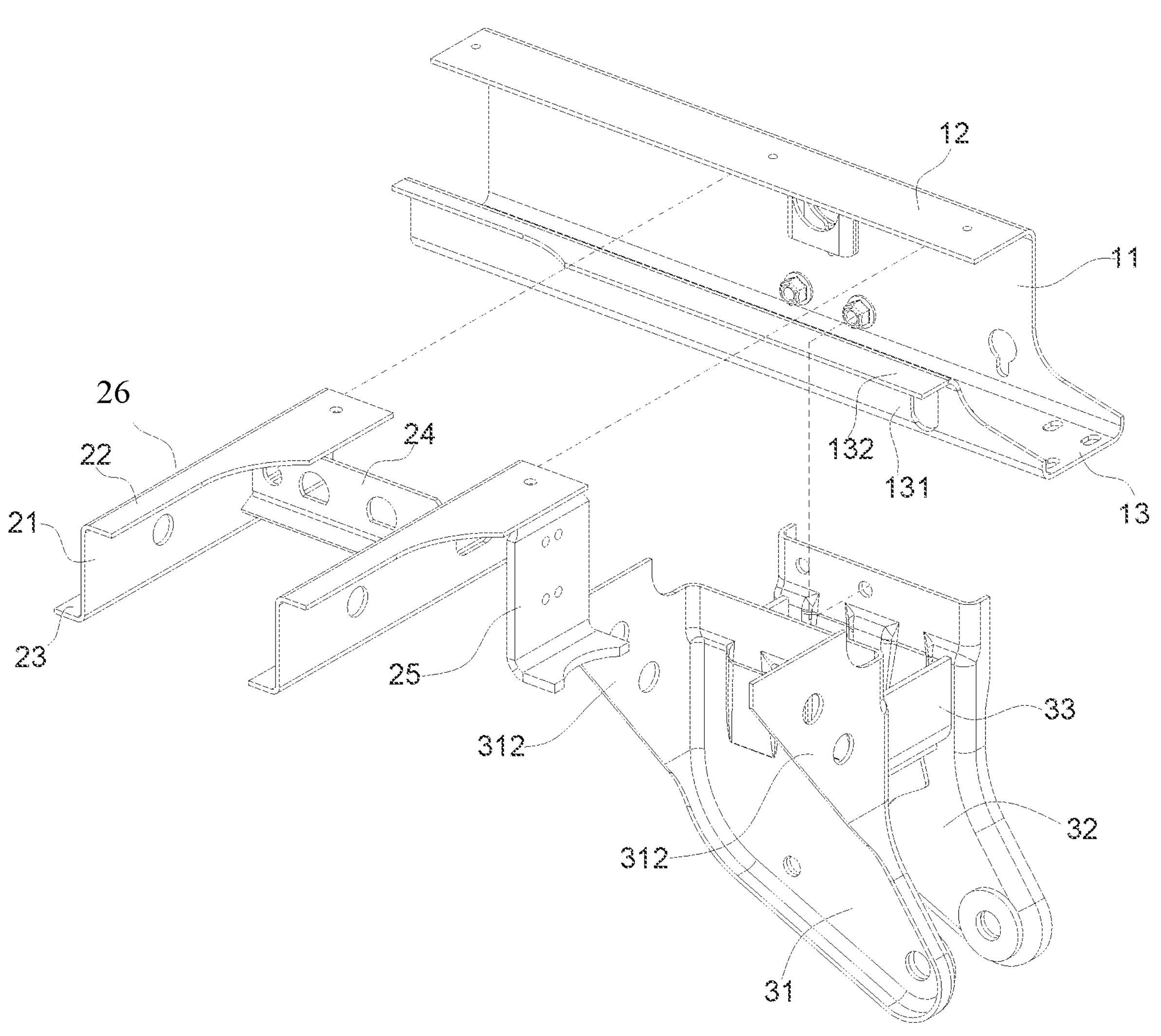
FIG. 3 is a schematic view of the assembly of the longitudinal beams, cross beams and brackets of the sliding frame assembly in FIG. 2.
Figure 4:
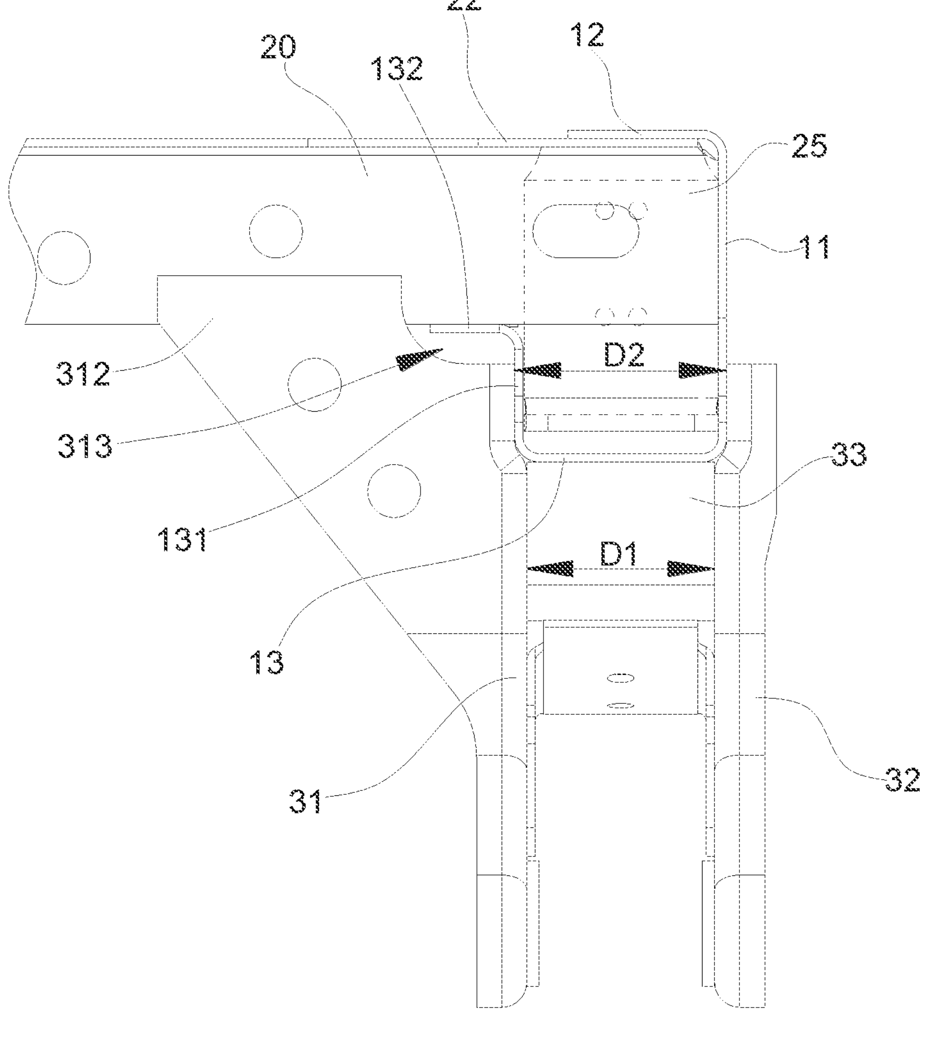
FIG. 4 is a schematic view of the connection of the longitudinal beams, cross beams and brackets of the sliding frame assembly in FIG. 2.
Figure 5:
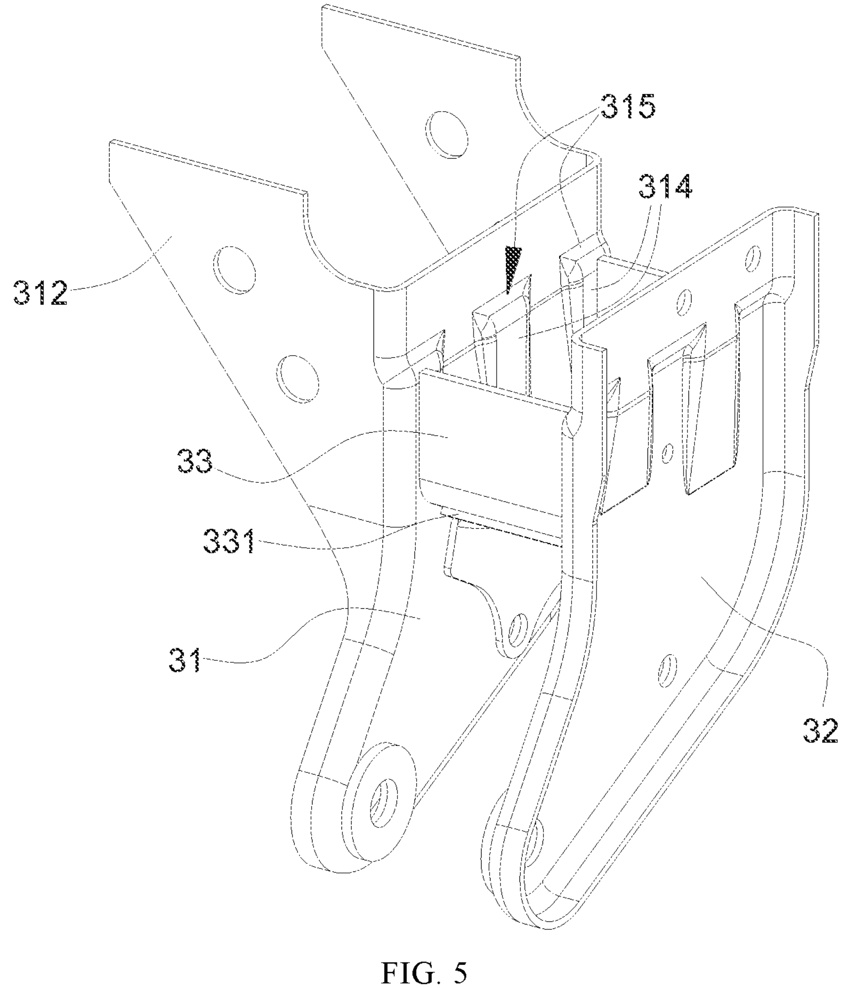
FIG. 5 is a schematic structural view of the bracket in FIG. 2.

As shown in FIGS. 1, 2, 3, 4 and 5, a sliding frame assembly for trailers according to an embodiment of the present application is provided, which includes two longitudinal beams 10, a number of cross beams 20 and a suspension system 40. The two longitudinal beams 10 are respectively placed on both sides of the sliding frame assembly and extend along the length direction of the sliding frame assembly. A number of cross beams 20 are all connected between the two longitudinal beams 10, thus forming a frame. The suspension system 40 is installed on a lower part of the frame. The opposite side of the two longitudinal beams 10 is defined as an inner side, and the other side is defined as an outer side. The longitudinal beam 10 is formed by bending a plate, and includes a side wall 11, a top wall 12 formed by bending a top of the side wall 11 approximately 90 degrees inward, and a bottom wall 13 formed by bending a bottom of the side wall 11 approximately 90 degrees inward. An opening is formed between the top wall 12 and the bottom wall 13 in the inner side of the longitudinal beam 10, an end of the cross beam 20 penetrates through the opening in the inner side of the longitudinal beam 10. An end surface of the cross beam 20 is fixed to an inner surface of the side wall 11, an upper surface of the cross beam 20 is fixed to a lower surface of the top wall 12, and a lower surface of the cross beam 20 is fixed to an upper surface of the bottom wall 13. The suspension system 40 includes a bracket 30, and the suspension system 40 is connected below the frame through the bracket 30. Specifically, the bracket 30 includes an outer wall plate 32, an inner wall plate 31, and a connecting piece 33. The outer wall plate 32 is located outside the inner wall plate 31 and faces the inner wall plate 31 at a certain distance. The connecting piece 33 is connected between the outer wall plate 32 and the inner wall plate 31 to connect the inner wall plate 31 and the outer wall plate 32 together. An upper end of the outer wall plate 32 is close to an outer surface of the side wall 11 and is connected to the side wall 11. Specifically, the upper end of the outer wall plate 32 may be fixed to the side wall 11 by bolts, or may be fixed to the side wall 11 by welding. A top end of the inner wall plate 31 is placed in the inner side of the longitudinal beam 10 and is fixed to the longitudinal beam 10. The inner wall plate 31 may be fixed to the longitudinal beam 10 by bolts or welding. Both sides of the inner wall plate 31 are bent approximately 90 degrees in the direction away from the outer wall plate 32 to form two support plates 312. The two support plates 312 are connected to the cross beam 20 after extending toward the inner side. The support plates 312 may be fixed to the cross beam by welding, or may be connected to the cross beam by bolts or other fixing methods.

In the above solution of the present application, since one support plate 312 is integrally formed on each side of the inner wall plate 31 of the bracket, and the two support plates 312 are connected to the cross beam, the support plate 312 forms a support structure between the cross beam 20 and the bracket 30, which increases the lateral rigidity of the connection part between the bracket 30 and the longitudinal beam, ensuring better driving performance of the vehicle and improving the safety of the vehicle.

In an embodiment, the present application sets the cross section of the longitudinal beam 10 to a G-shaped configuration. Specifically, an upwardly extending vertical support wall 131 is provided at an inner edge of the bottom wall 13, and a horizontal support wall 132 is provided at the top of the vertical support wall 131 extending in a direction away from the side wall 11, which is equivalent to forming a step on the bottom wall 13 by bending, and an upper edge of the step is bent inward to form the horizontal support wall 132. The opening on the longitudinal beam 10 is located between the horizontal support wall 132 and the top wall 12. After the end of the cross beam 20 penetrates into the longitudinal beam 10 through the opening, the lower surface of the cross beam 20 is supported by the horizontal support wall 132, and the lower surface of the cross beam 20 is welded to the horizontal support wall 132. A top of the inner wall plate 31 abuts an inner surface of the vertical support wall 131, and the inner wall plate 31 and the vertical support wall 131 are fixed by welding or bolted. The cross beam 20 includes two vertical mating surfaces, which are staggered by a certain distance in the length direction of the longitudinal beam 10. The two support plates 312 integrally formed on the inner wall plate 31 are respectively welded to the two mating surfaces. For example, when a square tube is used to form the cross beam, the two mating surfaces are two sides of the cross beam. A top of the support plate 312 protrudes from a top of the inner wall plate 31, that is, an upper edge of the support plate 312 is higher than the top of the inner wall plate 31. After the inner wall plate 31 is placed against the inner surface of the vertical support wall 131, at least a part of the top of the support plate 312 may protrude from an upper surface of the horizontal support wall 132, so that the support plate 312 may be attached to the mating surface of the cross beam 20 and have a relatively large mating area with the mating surface, thereby allowing a large welding area between the support plate 312 and the mating surface and the welding strength between the support plate 312 and the cross beam 20 may meet the requirements. In addition, an avoidance recess 313 is formed on the support plate 312 close to the inner wall plate 31. When the inner wall plate 31 abuts the vertical support wall 131, the avoidance recess 313 may just avoid the horizontal support wall 132, so that a portion of the support plate 312 that is not provided with the avoidance recess 313 extends upward from the inner side of the horizontal support wall 132 to a side of the mating surface of the cross beam.

In the above solution, since two support plates 312 are formed on the inner wall plate 31, the distance between the two support plates 312 is equivalent to the width of the inner wall plate 31. If the cross beam is made of an integral component such as a square tube, the two support plates 312 must be welded on both sides of the cross beam. In this way, the width of the cross beam needs to be equivalent to the width of the inner wall plate 31, resulting in a larger width of the cross beam and the overall weight of the sliding frame assembly is difficult to control. Therefore, the cross beam 20 may include two cross beam units 26 and two end plates 24, and the two cross beam units 26 and the two end plates 24 are welded together. Specifically, the extension direction of the two cross beam units 26 is consistent with the width direction of the sliding frame assembly, and the two cross beam units 26 are staggered by a certain distance in the length direction of the sliding frame assembly. The two end plates 24 are respectively connected to the two cross beam units 26 between the ends of the two cross beam units 26. The cross beam unit 26 may be formed by bending a plate, and its cross-sectional shape is generally Z-shaped. Specifically, the cross beam unit 26 includes a web plate 21, a top flange 22 that is formed by bending a top of the web plate 21 at approximately 90 degrees toward one side of the web plate 21, and a bottom flange 23 that is formed by bending a bottom of the web plate 21 at approximately 90 degrees toward the other side of the web plate 21. After the end of the cross beam unit 26 penetrates into the longitudinal beam 10 through the opening of the longitudinal beam 10, the top flange 22 of the cross beam unit 26 abuts against a lower surface of the top wall 12. The top wall 12 and the top flange 22 may be fixed by welding or bolted together. The bottom flange 23 is close to the upper surface of the horizontal support wall 132, and the bottom flange 23 and the horizontal support wall 132 may be welded or bolted together. The two mating surfaces are respectively located on sides of the web plates 21 of the two cross beam units 26. The distance between the two cross beam units 26 may be adjusted according to the width of the inner wall plate 31, and then the two support plates 312 on the inner wall plate 31 may be better attached to the sides of the web plates 21 of the two cross beam units 26, so as to facilitate welding between the support plates 312 and the web plates 21. In order to make the welding area relatively large and increase the welding strength, the width of the top flange 22 at a point where the top flange 22 matches the top wall 12 is greater than the width of the top flange 22 at other locations; that is to say, the width of the end of the top flange 22 that penetrates into the inside of the opening is set to be relatively large to increase the matching area between the top flange 22 and the top wall 12, thereby increasing the welding strength. The width of the bottom flange 23 at a point where the bottom flange 23 matches the horizontal support wall 132 is greater than the width of the bottom flange 23 at other positions, so that the matching area of the bottom flange 23 and the horizontal support wall 132 is increased and thus the welding strength between the bottom flange 23 and the horizontal support wall 132 is increased. Similarly, the width of horizontal support wall 132 at a point where the horizontal support wall 132 matches the bottom flange 23 is greater than the width of the horizontal support wall 132 at other positions, which further increases the welding strength of the horizontal support wall 132 and the bottom flange 23. In other embodiments, the cross-section of the cross beam unit 26 may also be C-shaped, that is, the top flange 22 and the bottom flange 23 are located on the same side of the web plate 21, and the two cross beam units 26 are arranged oppositely, so that side surfaces of the web plates 21 of the two cross beam unit 26 that are away from each other respectively form a mating surface that is welded to the two support plates 312.

A support member 25 is also provided on outside of the cross beam unit 26 near an end of the longitudinal beam 10, and a top of the support member 25 is connected to a lower surface of the top flange 22 and a bottom of the support member 25 is connected to the longitudinal beam 10. Both sides of the bottom of the support member 25 may be welded to the side wall 11 and the vertical support wall 131 respectively, or the bottom of the support member 25 may be welded to the upper surface of the bottom wall 13. The support member 25 is located at an end of the longitudinal beam 10 and serves the purpose of anti-collision.

The cross-section of the connecting piece 33 of the bracket 30 is U-shaped, both sides of the connecting piece in the extending direction are welded to the outer wall plate 32 and the inner wall plate 31 respectively, the upper end of the opening of the connecting member 33 is welded to the lower surface of the bottom wall 13, and the parts on both sides of the U-shaped upper opening are butt-welded to the lower surface of the bottom wall 13. A reinforcing member 331 is provided below the connecting piece 33 and abuts against a lower surface of the connecting piece 33, each side of the reinforcing member 331 is provided with one downwardly extending reinforcement plate 332, and the two reinforcement plates 332 respectively abut and are welded to the outer wall plate 32 and the inner wall plate 31. After the connecting piece 33 is connected to the inner wall plate 31 and the outer wall plate 32, the bracket 30 forms a U-shaped structure with an upper opening, and the bottom of the longitudinal beam 10 is inserted into the U-shaped opening of the bracket 30, so that the top of the outer wall plate 32 abuts and is connected the side wall 11 outside the longitudinal beam 10, and the top of the inner wall plate 31 abuts and is connected to the vertical support wall 131 inside the longitudinal beam 10. One support portion is respectively formed on both opposite surfaces of the outer wall plate 32 and the inner wall plate 31, and both sides of the bottom wall 13 are respectively placed on the support portions of the outer wall plate 32 and the inner wall plate 31 after the longitudinal beam 10 matches the bracket 30. A boss 314 is protrudingly provided on an opposite surface of the inner wall plate 31 with respect to the outer wall plate 32, and a support portion 315 is formed on the top of the boss 314. A boss 321 is protrudingly provided on an opposite surface of the outer wall plate 32 with respect to the inner wall plate 31, and a support portion 322 is formed on the top of the boss 321. A portion of the inner wall plate 31 located above the boss 314 is in contact with the inner surface of the vertical support wall 131, and a portion of the outer wall plate 32 located above the boss 321 is in contact with the outer surface of the side wall 11. Further, a distance between the boss 321 on the outer wall plate 32 and the boss 314 on the inner wall plate 31 is D1, and a distance between the portion of the outer wall plate 32 located above the boss 321 and the portion of the inner wall plate 31 located above the boss 314 is D2, wherein D2 is greater than D1. The boss 314 and the boss 321 are used to provide support for both sides of the bottom wall 13, so that when the longitudinal beam 10 is assembled with the bracket 30, the longitudinal beam 10 and the bracket 30 may be positioning, and the connection strength between the longitudinal beam 10 and the bracket 30 may be further improved.

It should be pointed out that in the above embodiment of the present application, the vertical support wall 131 and the horizontal support wall 132 are provided on the bottom wall 13 of the longitudinal beam 10, so that the cross section of the longitudinal beam 10 is formed as a G-shaped structure, the top of the inner wall plate 31 may abut against the vertical support wall 131; In other embodiments, the longitudinal beam 10 may be set in a C shape, that is, the horizontal support wall 132 is omitted, or the bottom wall 13 may be set in a straight state, and the vertical support wall 131 is omitted. The top of the inner wall plate 31 is directly connected to the lower surface of the bottom wall 13 of the longitudinal beam 10, and at the same time, the support plates 312 on both sides of the inner wall plate 31 are connected to the mating surfaces of the cross beam.

In the present application, since one support plate is integrally formed on each side of the inner wall plate of the bracket, and the two support plates are connected to the cross beam, the support plate forms a support structure between the cross beam and the bracket, which increases the lateral rigidity of the connection part between the bracket and the longitudinal beam, ensuring better driving performance of the vehicle and improving the safety of the vehicle.

The above embodiments are only used to illustrate the technical solution of the present application, but not to limit it; Although the present application has been described in detail with reference to the foregoing embodiments, those of ordinary skill in the art will understand that they can still modify the technical solutions recorded in the foregoing embodiments, or make equivalent substitutions for some of the technical features, and these modifications or substitutions do not deviate from the essence of the corresponding technical solutions from the spirit and scope of the technical solutions of each embodiment of the present application.

What is claimed:

1. A sliding frame assembly for trailers, wherein the sliding frame assembly for trailers comprises two longitudinal beams, a number of cross beams connected between the two longitudinal beams, and a suspension system;

the longitudinal beam includes a side wall, a top wall located at the top of the side wall, and a bottom wall located at the bottom of the side wall, wherein an opening is formed between the top wall and the bottom wall in an inner side of the longitudinal beam, and an end of the cross beam penetrates through the opening; an end surface of the cross beam and an inner surface of the side wall, an upper surface of the cross beam and a lower surface of the top wall, a lower surface of the cross beam and an upper surface of the bottom wall are fixedly connected together respectively;

the suspension system includes a bracket, the bracket includes an outer wall plate, an inner wall plate opposite to the outer wall plate, and a connecting piece connected between the outer wall plate and the inner wall plate, wherein an upper end of the outer wall plate abuts an outer surface of the side wall and is connected to the side wall, an upper end of the inner wall plate is connected to the longitudinal beam, and the inner wall plate includes a support plate bent in a direction away from the outer wall plate, and the support plate is connected to the cross beam;

wherein the cross-section of the connecting piece is U-shaped, the connecting piece is disposed between the outer wall plate and the inner wall plate, and the connecting piece includes a top portion coupled with a lower surface of the bottom wall of the longitudinal beam.

2. The sliding frame assembly for trailers of claim 1, wherein, a reinforcing member is provided below the connecting piece and abuts against a lower surface of the connecting piece, each side of the reinforcing member is provided with one downwardly extending reinforcement plate, and the two reinforcement plates respectively abut and are welded to the outer wall plate and the inner wall plate.

3. The sliding frame assembly for trailers of claim 1, wherein, an inner edge of the bottom wall is provided with an upwardly extending vertical support wall and a horizontal support wall extending from a top of the vertical support wall in a direction away from the side wall, the opening is located between the horizontal support wall and the top wall, and a lower surface of the cross beam is welded to an upper surface of the horizontal support wall; an upper end of the inner wall plate abuts and is welded to an inner surface of the vertical support wall, the cross beam includes two vertical mating surfaces staggered by a certain distance along the length of the longitudinal beam, and the two support plates respectively abut and are welded to the two vertical mating surfaces.

4. The sliding frame assembly for trailers of claim 3, wherein, a top of the support plate protrudes upward from a top of the inner wall plate, and an avoidance recess is formed on the support plate for avoiding the horizontal support wall.

5. The sliding frame assembly for trailers of claim 3, wherein, the cross beam includes two cross beam units and two end plates connected between two ends of the two cross beam units, the cross beam unit includes a web plate, a top flange located at a top of the web plate, and a bottom flange located at a bottom of the web plate, the top flange is close to the lower surface of the top wall and connected to the top wall, and the bottom flange is close to the upper surface of the horizontal support wall and connected to the horizontal support wall; the two vertical mating surfaces are respectively located on the web plate of the two cross beam units.

6. The sliding frame assembly for trailers of claim 5, wherein, a width of the top flange at a point where the top flange matches the top wall is greater than the width of the top flange at other locations; a width of the bottom flange at a point where the bottom flange matches the horizontal support wall is greater than the width of the bottom flange at other positions; a width of the horizontal support wall at a point where the horizontal support wall matches the bottom flange is greater than the width of the horizontal support wall at other positions.

7. The sliding frame assembly for trailers of claim 5, wherein, a support member is also provided on outside of the cross beam unit near an end of the longitudinal beam, and a top of the support member is connected to a lower surface of the top flange and a bottom of the support member is connected to the longitudinal beam.

8. The sliding frame assembly for trailers of claim 1, wherein, the outer wall plate includes a first support portion and the inner wall plate includes a second portion, and the bottom wall are placed on the first support portion of the outer wall plate and the second portion of the inner wall plate.

9. The sliding frame assembly for trailers of claim 8, wherein, the opposite surfaces of the outer wall plate and the inner wall plate are both provided with a protruding boss, the support portion is located on a top of the boss, the connecting piece is located between the boss of the outer wall plate and the boss of the inner wall plate, a distance between the boss on the outer wall plate and the boss on the inner wall plate is D1, and a distance between a portion of the outer wall plate located above the boss on the outer wall plate and a portion of the inner wall plate located above the boss on the inner wall plate is D2, wherein D2 is greater than D1.

* * * * *